3,453,550
PHASE COMPUTER
John H. Kuck, Silver Spring, Md., assignor to the United States of America as represented by the Secretary of the Navy
Filed Nov. 17, 1965, Ser. No. 508,398
Int. Cl. H02m 3/06
U.S. Cl. 328—109          10 Claims

ABSTRACT OF THE DISCLOSURE

The present invention relates to phase computing circuitry which, given the in-phase and quadrature components of a first signal relative to a second signal, produces an output signal which is the accurate analog of the phase difference between these first and second signals over a range of 0° to 360°, without ambiguities. The output of a reference oscillator is split into its sine and cosine components which are then combined with the input in-phase and quadrature component signals to produce a resultant cosine signal, at reference frequency, whose phase is shifted relative to the reference signal by an amount equal to the phase difference to be computed. The phase of this resultant cosine signal is then compared with that of the cosine component of the reference signal, by detecting the time between the negative-going zero crossing of each of these cosine signals. An integrator and boxcar circuit is controlled in accordance with this detected time difference to produce an output signal whose amplitude varies in proportion with; i.e., it is the accurate analog of, the phase difference between the original first and second signals.

---

The present invention generally relates to phase computing apparatus and more particularly relates to such apparatus which, given the in-phase and quadrature components of a first signal relative to a second signal, produces an output that varies in proportion to; i.e., is the accurate analog of, the phase difference between these first and second signals over a range of 0° to 360°, without ambiguities.

Much pertinent information derived in radar systems, for example, appears in the form of the relative phase between two system signals. The accurate determination of this phase difference and the conversion thereof into a usable proportional or analog control signal, such as a voltage magnitude, has always been a problem. More specifically, interferometer radar systems, correlation radar systems, and Doppler radar systems all depend very heavily upon the accuracy with which such phase determinations and conversions can be made. Prior art phase detectors have experienced much difficulty in accurately determining relative phase over a full range of 0° to 360° and are plagued with ambiguity problems which, it is obvious, seriously restrict the usefulness of these prior art devices.

It is accordingly an object of the present invention to provide apparatus for computing, without ambiguity, the phase difference between two signals over a full 0° to 360° range of phase difference.

It is another object of the present invention to provide apparatus for computing more accurately the phase of an unknown signal relative to a second, known signal when given the in-phase and quadrature components thereof.

A further object of the present invention is to provide phase computing circuitry capable of producing an output voltage whose amplitude is an accurate and unambiguous analog of the phase difference between two signals.

Other objects and many of the attendant advantages of this invention will be readily appreciated as the same becomes better understood by reference to the following detailed description, when considered in connection with the accompanying drawings, wherein.

Figure 1:
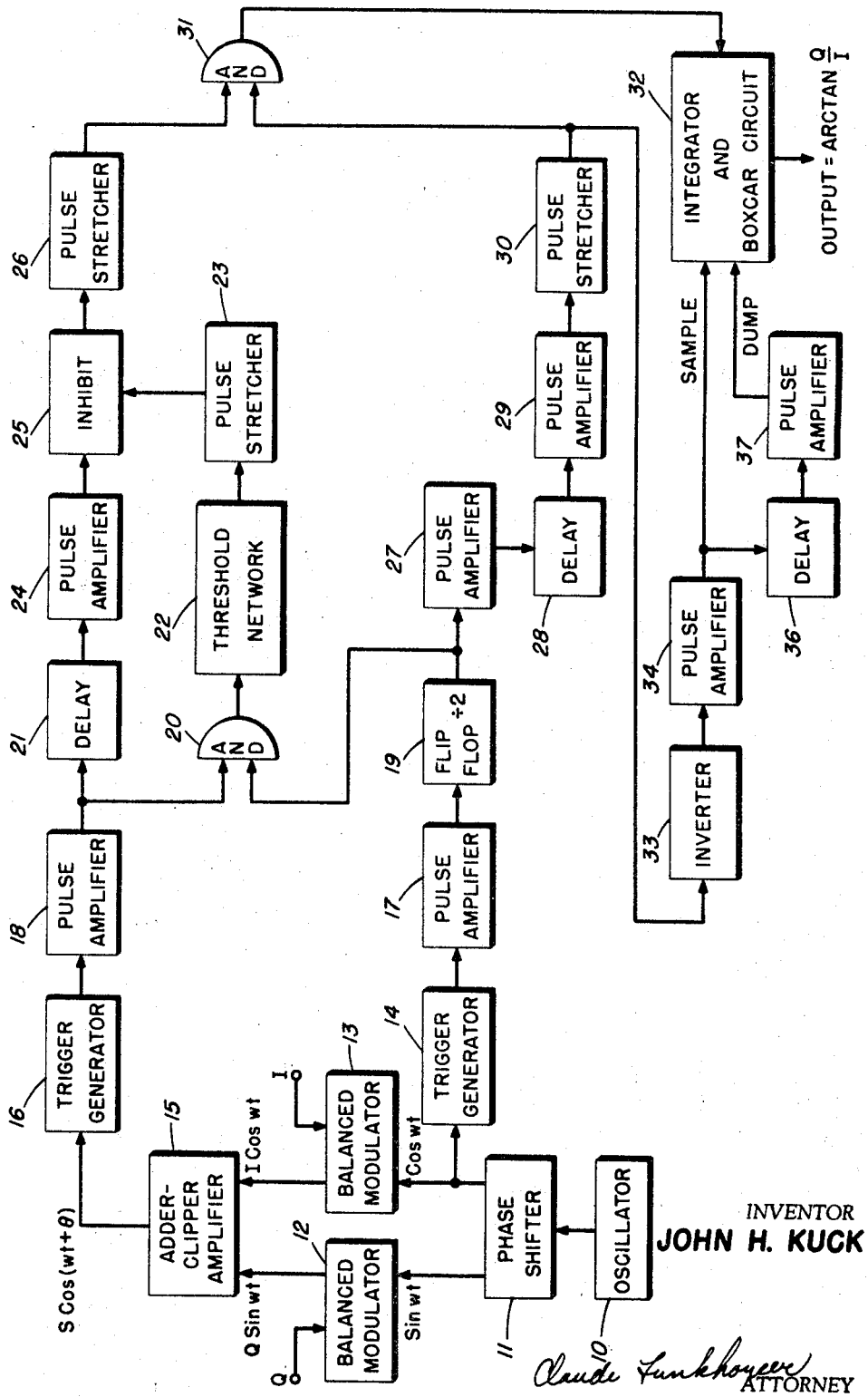
FIG. 1 is a schematic block diagram of one embodiment of the present invention.

Referring to the block diagram of FIG. 1, the preferred embodiment of the present invention operates to accurately compute the phase difference between two signals and can be used, for example, to determine the unknown phase of a first, incoming radar signal relative to a second, precisely known signal. By way of example, this second or known signal might be produced by the local oscillator circuitry of the radar receiver.

More specifically, the illustrated apparatus of FIG. 1 determines this phase relationship by proper manipulation of a pair of input voltages I and Q whose respective amplitudes are analogs of the in-phase and quadrature components respectively of the first, unknown signal relative to the precisely known signal. These I and Q component voltages may be derived in any number of well-known ways such as, for example, from conventional, single-sideband, balanced modulator circuitry familiar to those skilled in the art.

Given these in-phase and quadrature component relationships between the first and second signals, in the form of the above-mentioned I and Q voltage signals, it is then proposed in accordance with the teachings of the present invention to process such I and Q voltages with a third, reference frequency signal $wt$ in such a way that, by use of the well-known relationship $$I \cos wt + Q \sin wt = A \cos (wt + \theta)$$

where $A = \sqrt{I^2 + Q^2}$ and $\theta = \arctan Q/I$, the unknown phase angle $\theta$ will be determined, between the original first and second signals.

Keeping the above relationships in mind and referring to FIG. 1 of the drawings, the reference frequency signal $wt$ is supplied by a suitable oscillator circuit 10, of any conventional construction. The oscillator output reference signal is then applied to a suitable phase shifter network 11 where the reference signal is split into its sin $wt$ and cos $wt$ components, having exactly equal magnitudes and being exactly 90° apart in phase.

The sin $wt$ output from the phase shifter 11 is supplied to a balanced modulator 12, along with the input quadrature component voltage Q; whereas, the cos $wt$ output from the phase shifter 11 is supplied to a second balanced modulator circuit 13, along with the in-phase component voltage I. Additionally, the cos $wt$ output from the phase shifter 11 is supplied to a suitable trigger generator 14, to be discussed in more detail hereinafter.

Each of the balanced modulator circuits 12 and 13 essentially operates, in a well-known manner, to multiply together the two input signals applied thereto. A pair of signals $Q \sin wt$ and $I \cos wt$ are thus derived from the balanced modulators 12 and 13 respectively, and, are then applied to a combination adder-clipper-amplifier circuit 15 where these two signals are added together and then clipped to produce a resultant signal $S \cos (wt + \theta)$, where S represents a constant amplitude. This resultant signal from circuit 15 is then supplied to a second trigger generator 16, identical to the trigger generator 14 which receives the cos $wt$ signal from the phase shifter network 11.

It will thus be noted that the output from the adder-clipper-amplifier circuit 15 is also a cosine signal whose phase angle $\theta$, relative to the cos $wt$ output from the phase shifter 11, is equal to the phase difference between the two original signals under consideration. Therefore, by measuring the phase difference between the resultant $S$ cos $(wt+\theta)$ signal and the cos $wt$ signal, the original unknown phase relationship, in question, will then be known.

In order to facilitate this measurement of the phase difference between the two cosine signals shown in FIG. 1 of the drawings, the trigger generators 14 and 16 are employed to produce respective output trigger pulses each time its respective input, cosine signal passes through a given operating point. For example, in the preferred embodiment of the present invention, the trigger generator 16 produces an output trigger pulse each time the $$S \cos (wt+\theta)$$

signal passes through its negative-going zero 16 produces an output trigger pulse each time the crossing point; whereas, the trigger generator 14 produces a corresponding output trigger pulse each time the cos $wt$ signal passes through its negative-going zero crossing point. Accordingly, by then measuring the time interval between the output trigger pulses from the generators 14 and 16, it is possible to detect the phase difference between the input cosine signals, and therefore also, the phase angle of the original unknown signal.

Figure 2:
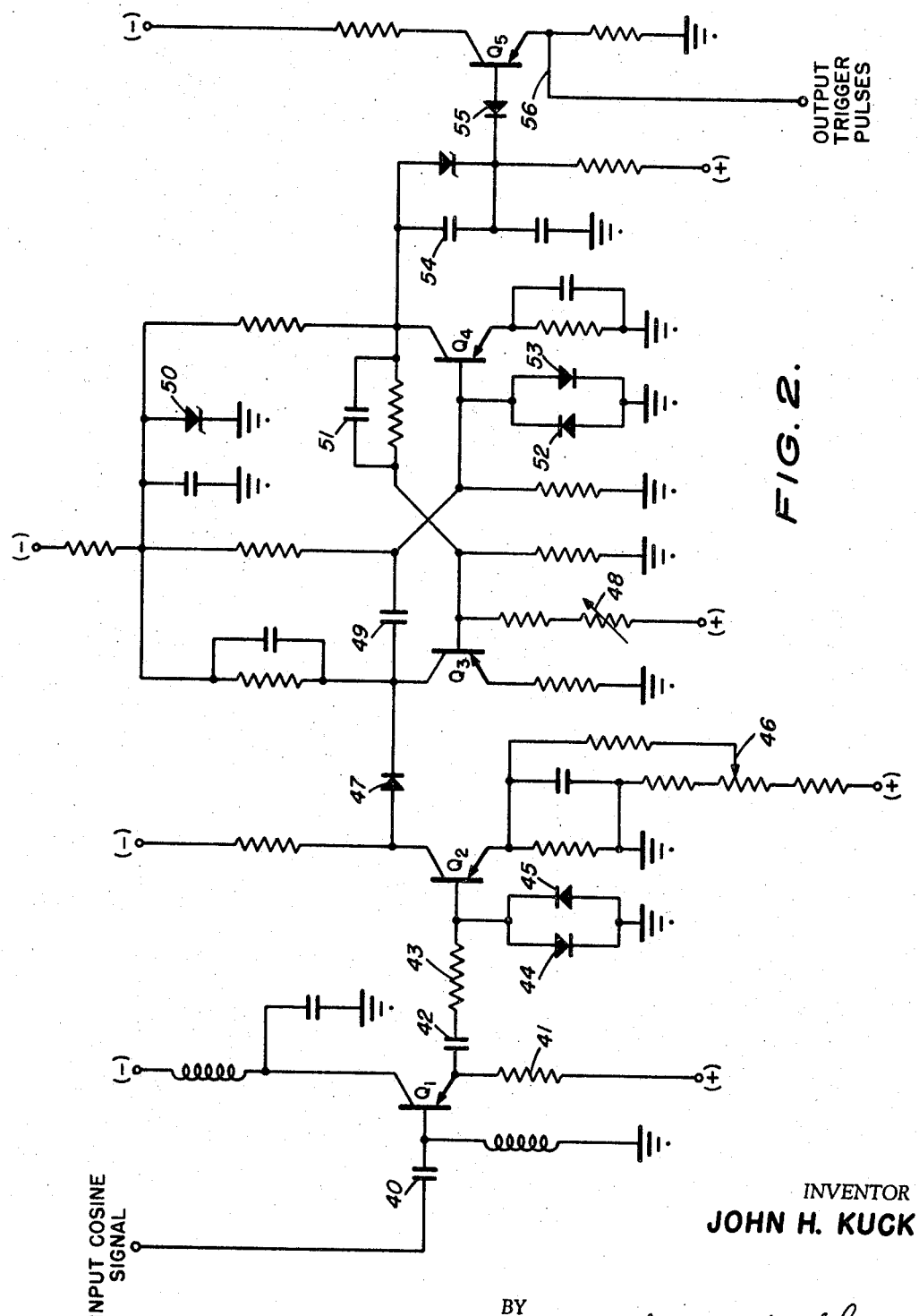
FIG. 2 is a circuit diagram of the trigger generator employed in the illustrated embodiment of FIG. 1.

Referring now to FIG. 2 and the detailed circuit diagram of the preferred trigger generator configuration used in the present invention, the input signal thereto (either of the cosine signals shown in FIG. 1) is first applied, via capacitor 40, to a conventional emitter follower circuit comprising transistor $Q_1$ and emitter resistor 41. The output signal from the emitter of transistor $Q_1$ is then applied, through an RC coupling network comprising capacitor 42 and resistor 43, to the base of transistor $Q_2$. However, at the base of transistor $Q_2$, the signal from the emitter follower circuit is symmetrically clipped about zero volts by a diode clipper network including diodes 44 and 45.

The transistor $Q_2$ is included in a conventional amplifying stage and its bias, as selected by the potentiometer arm 46, is such that only the negative portions of the clipped waveform appearing at the base of transistor $Q_2$ are amplified. As a result, positive-going pulses appear at the collector of transistor $Q_2$ and are coupled through a so-called fast diode 47 to a multivibrator circuit including transistors $Q_3$ and $Q_4$.

The operation of this multivibrator circuit of FIG. 2 is controlled by a threshold adjustment 48 which is set so that, with zero input voltage, the multivibrator circuit is just out of the free-running condition, with transistor $Q_4$ conducting and transistor $Q_3$ cut-off. Consequently, each time the input cosine signal passes through its negative-going zero crossing point, a negative signal appears at the base of transistor $Q_2$, is amplified, inverted and coupled through the fast diode 47 and coupling capacitor 49 to the base of transistor $Q_4$ which is normally conducting.

As a result, the transistor $Q_4$ is driven to cut-off and its collector voltage increases negatively toward the supply voltage set by Zener diode 50. Consequently, the normally off transistor $Q_3$ is momentarily turned on by the negative pulse coupled through capacitor 51 to its base from the collector of transistor $Q_4$, and until the capacitor 49 discharges sufficiently to again cause the voltage at the base of transistor $Q_4$ to go sufficiently negative to turn the transistor $Q_4$ back on and thus return the multivibrator to its normal operating state, ready for another cycle. To insure signal symmetry at the base of transistor $Q_4$, a second diode clipper network comprising diodes 52 and 53 is connected thereto.

Figure 3:
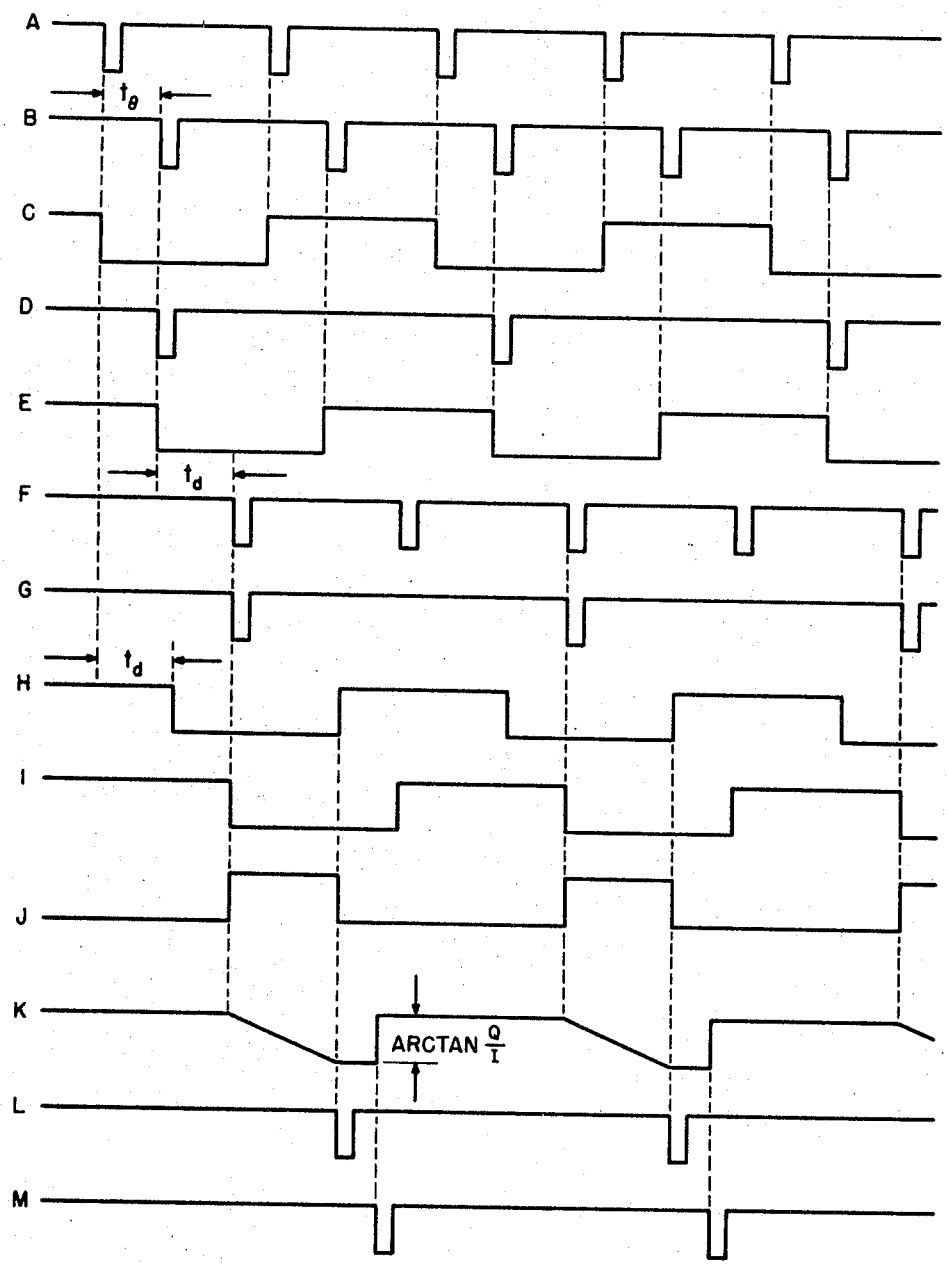
FIG. 3 is a chart of the waveforms generated at various stages in the embodiment of FIG. 1.

Because of this above-described multivibrator operation, a negative-going pulse thus appears at the output of the multivibrator (at the collector of transistor $Q_4$), each time the input cosine signal passes through a negative-going zero crossing, and is coupled through capacitor 54 and diode 55 to the base of a second emitter follower circuit including transistor $Q_5$. As a result, a series of negative trigger pulses occurs at the output terminal 56 of the circuitry of FIG. 2, to mark the negative-going zero crossing points for the input cosine signal. Referring now to FIG. 3 of the accompanying drawings, the upper two waveforms designated A and B illustrate the output trigger pulses produced by the trigger generators 14 and 16 respectively, of FIG. 1, after they have been amplified by identical pulse amplifiers 17 and 18 respectively.

As pointed out previously, two adjustments are provided for the trigger generating circuitry of FIG. 2 and are designated as the bias adjustment 46 and the threshold adjustment 48. More specifically, the bias control 46 is initially set such that the voltage on the left-hand side (anode) of the fast diode 47, as viewed in FIG. 2, is more negative than the voltage supplied by the Zener diode 50 in the multivibrator stage. The threshold control 48 is then adjusted so that, with zero input voltage, the multivibrator is just out of the free running condition; i.e., transistor $Q_3$ is forced into cut-off, by adjusting the threshold control 48 so that the voltage on the right-hand side (cathode) of the diode 47 is just ready to go less negative than the Zener supply voltage. Finally, the bias control 46 is readjusted so that the voltage across the diode 47 is zero; i.e., so that the collector voltages of transistors $Q_2$ and $Q_3$ are equal to the Zener voltage. When these steps are properly performed, optimum sensitivity will result and a very small, negative signal on the base of transistor $Q_2$ will cause the multivibrator circuit to fire, producing an output trigger pulse.

Referring once again to FIG. 3, it should be noted that there is a phase or time difference, designated as $t_0$, between the pulse waveform A and the pulse waveform B. It is assumed here that the illustrated waveforms of FIG. 3 represent the condition wherein the cos $wt$ output from the phase shifter 11 is lagging the $S$ cos $(wt+\theta)$ signal from the amplifier circuit 15 by the amount $t_0$ in FIG. 3. As mentioned previously, this quantity $t_0$ is also an accurate indication of the phase difference between the original two signals in question; i.e., in the example given above, $t_0$ is the phase difference between the incoming radar signal and the precisely known, local oscillator signal.

Referring now to FIG. 1, the output trigger pulses of pulse amplifier 17 are then supplied to a flip-flop circuit 19 where they are divided by two, to produce a half frequency square wave illustrated by the waveform C in FIG. 3. This square wave from the flip-flop divider 19 is supplied as one input to an AND gate 20. The other input to the AND gate is the trigger pulse output from the pulse amplifier 18.

This AND gate 20 may be of any well-known construction and is operated such that, in effect, a trigger pulse is passed therethrough each time one of the output trigger pulses from the pulse amplifier 18 coincides with the negative portion of the flip-flop output square wave. More specifically, the output of the AND gate 20 is illustrated at waveform D in FIG. 3.

The output trigger pulses from the pulse amplifier 18, in FIG. 1, are also supplied to a delay circuit 21 designed to cause a predetermined delay of these trigger pulses, for reasons which will become apparent as the description progresses. Referring to FIG. 3, the waveform F illustrates the delayed trigger pulses produced by delay circuit 21 and the predetermined delay imparted thereby, to the trigger pulses from pulse amplifier 18, is designated as $t_d$.

In FIG. 1, a threshold network 22 is connected to the output of the AND gate 20 and functions to prevent two pulses from being applied to the pulse stretcher 23 during any given half-cycle of the input reference frequency from oscillator 10. More specifically, the pulse stretcher 23 is a circuit of well-known configuration which is set, in accordance with the present invention, to go negative (produce a negative output) for a predetermined time interval equal to the half-cycle time of the flip-flop 19, when an input trigger pulse is applied thereto. However, if the width of the trigger pulses from pulse amplifier 18 is not negligible when compared to the width of a half-cycle from flip-flop 19, a small region may exist wherein portions of two successive trigger pulses, from generator circuit 16, would be passed by the AND gate 20 and cause erratic firing of the pulse stretcher 23. To obviate this possible erratic firing of the pulse stretcher 23, the threshold network 22 permits only the larger of two pulses, occurring under such a condition, to activate the pulse stretcher 23. Referring to FIG. 3, the output of the pulse stretcher 23 is illustrated at waveform E.

The output pulses from the delay network 21 are applied to a conventional pulse amplifier 24, similar in design to pulse amplifiers 17 and 18, and subsequently, as one input to an inhibit circuit 25. The other input to inhibit circuit 25 is the output from the pulse stretcher 23. As a result, every other pulse from the amplifier 24 is blocked by the inhibit circuit 25 (see waveform G in FIG. 3) and the pulse stretcher 26 is thus triggered at a rate equal to the output frequency produced by the division flip-flop 19. This pulse stretcher 26 is also preset to go negative for a predetermined time interval equal to the duration of one-half cycle of the output waveform of flip-flop 19, each time it is triggered by an output pulse from inhibit circuit 25. The waveform I in FIG. 3 illustrated the output of the pulse stretcher 26.

The output square wave from the flip-flop 19 is furthermore supplied to a pulse amplifier 27. The amplified pulse output is then applied to a delay circuit 28 which imparts a delay $t_d$ equal to that imparted by delay circuit 21. Thereafter, the delayed signal is amplified at pulse amplifier 29 and is subsequently used to trigger a pulse stretcher 30 which is also set to go negative, upon application of the input thereto, for a time equal to that of the pulse stretcher 26. As a result, the output waveform from pulse stretcher 30 is that illustrated at waveform H in FIG. 3.

These respective outputs from the pulse stretchers 26 and 30 are applied to a coincidence circuit comprising the AND gate 31 which produces, as output, a positive pulse whose duration or pulse width is equal to the time during which these pulse stretcher outputs coincide in time. The output of the coincidence AND gate 31 is illustrated at waveform J in FIG. 3. It will furthermore be noted that the width of pulses in waveform J are moreover proportional to the quantity $t_0$ and therefore also proportional to the phase difference of the original two signals.

Connected to the output of the coincidence AND gate 31 is an integrator and boxcar circuit 32 which may be of any conventional design. The integrator portion thereof responds to the output coincidence pulse from the AND gate 31 and produces a substantially linearly varying voltage signal (see waveform K in FIG. 3) whose maximum amplitude is proportional to; i.e., is the analog of, the width of the coincidence pulse and thus the original phase difference in question. The boxcar portion of circuit 32 operates in a well-known manner to store the maximum value of the integrated signal, until a new input coincidence pulse is applied to the integrator.

This integrator and boxcar circuit 32 is controlled by suitable sample and dump pulses being generated by other circuitry of FIG. 1, whereby the boxcar portion of circuit 32 is repeatedly sampled, to provide the output analog voltage signal arc tan $Q/I$, and after each sampling operation the integrator portion is cleared and made ready to accept another coincidence pulse output from the AND gate 31. More specifically, the sample pulses are derived by first inverting the output of pulse stretcher 30, at circuit 33, and subsequently amplifying the inverted signal at pulse amplifier 34. These sample pulses are illustrated at waveform L in FIG. 3 and, it will be noted, are generated each time the output of pulse stretcher 30 goes positive. On the other hand, a dump pulse (see waveform M in FIG. 3) is produced by delaying the sample pulse slightly, at delay circuit 36, before application to pulse amplifier 37.

In view of the foregoing description, it is seen that the apparatus of FIG. 1 produces, as output, an analog voltage whose magnitude is proportional to arc tan $Q/I$; i.e., is indicative of the phase difference of the original two signals. Moreover, it will be seen that this analog output voltage signal has been produced without ambiguity and in a very accurate manner.

Obviously, many modifications and variations of the present invention are possible in the light of the above teachings. It is therefore to be understood that within the scope of the appended claims, the invention may be practiced otherwise than as specifically described.

What is claimed is:

1. Apparatus for computing the phase relationship between first and second signals over a range of 0 to 360 degrees, comprising
   a pair of component input signals whose respective amplitudes are analogs of the quadrature and in-phase components of said first signal relative to said second signal,
   a reference signal source for generating a reference frequency,
   means connected to said reference signal source for splitting said reference signal into its sine and cosine component signals,
   signal combining means connected to receive the component signals of each of said first signal and said reference signal for combining said component signals to produce a resultant signal at reference frequency whose phase differs from a selected one of the components of said reference signal by an amount indicative of the phase relationship between said first and second signals, and
   means responsive to said resultant signal and the selected component of said reference signal for producing an output signal representative of the phase difference between said resultant signal and said selected component of said reference signal.

2. The apparatus specified in claim 1 wherein said signal combining means comprises,
   first multiplying circuit means for multiplying the sine component of said reference signal by the quadrature component of said first signal, and
   second multiplying circuit means for multiplying the cosine component of said reference signal by the in-phase component of said first signal.

3. The apparatus specified in claim 2 wherein each of said first and second multiplying circuit means is a balanced modulator circuit.

4. The apparatus specified in claim 1 wherein said output signal producing means includes,
   a first trigger pulse generating circuit responsive to the selected component of said reference signal for generating a first trigger pulse when said component reaches a predetermined instantaneous condition,
   a second trigger pulse generating circuit responsive to said resultant signal for generating a second trigger pulse when said resultant signal reaches the same predetermined instantaneous condition, and
   means responsive to said first and second trigger pulses for producing an analog signal output which varies proportionately with the time interval between said first and second trigger pulses.

5. The apparatus specified in claim 4 wherein both of said resultant signal and said selected component are cosine functions and wherein said first and second trigger pulse generating circuits include, means for detecting a predetermined zero crossing point of each of said cosine component signal and said resultant cosine signal, and means responsive to said zero crossing detecting means for generating a first trigger pulse when said cosine component signal passes through said predetermined zero crossing point and for generating a second trigger pulse when said resultant cosine signal passes through predetermined zero crossing point.

6. The apparatus specified in claim 4 wherein said analog signal producing means comprises, a first square pulse producing circuit operably connected to said first trigger pulse generating circuit for producing a first square pulse having a predetermined pulse width in response to said first trigger pulse, a second square pulse producing circuit operably connected to said second trigger pulse generating circuit for producing a second square pulse also of said predetermined pulse width in response to said second trigger pulse, and a coincidence circuit means operably connected to receive as input said first and second square pulses for producing, as output, a coincidence pulse whose width is indicative of the interval during which first and second square pulses coincide in time.

7. The apparatus specified in claim 6 further including, an integrator circuit means connected to receive the output coincidence pulse from said coincidence circuit means for producing an output voltage signal whose amplitude is proportional to the width of said coincidence pulse and therefore also to the phase difference between said first and second signal.

8. The apparatus specified in claim 7 additionally including, sample control means responsive to a selected one of said first and second square pulses for sampling said integrator circuit means at a predetermined time to thereby produce said output voltage signal, and a time delayed means operably connected to said integrator circuit means for automatically clearing said integrator circuit means after said integrator circuit means has been sampled and said output voltage signal has been produced.

9. The apparatus specified in claim 4 wherein said first and second trigger pulse generating circuits generate a series of first and second trigger pulses, respectively, in response to said cosine component signal and said resultant cosine signal, and wherein said analog signal producing means includes, a first flip-flop circuit operably connected to said second trigger pulse generating circuit for generating an output square wave signal whose half-cycle period is equal to the time spacing between successive second trigger pulses, an AND gate operably connected to the outputs of said flip-flop circuit and said first trigger pulse generating circuit for producing an output pulse each time one of said first trigger pulses coincides with a selected half-cycle portion of the square wave output signal from said flip-flop circuit, an inhibit circuit operably connected to the outputs of said first trigger pulse generating circuit and said AND gate for passing to its output every other one of said first trigger pulses, a first pulse stretcher circuit operably connected to the output of said flip-flip circuit for producing an output pulse of predetermined pulse width when said selected half-cycle portion begins, a second pulse stretcher circuit operably connected to the output of said inhibit circuit for producing an output pulse of predetermined pulse width when said inhibit circuit passes one of said first trigger pulses, and coincidence circuit means operably connected to said first and second pulse stretcher circuit means for producing an output signal indicative of the time interval during which the output pulses from said first and second pulse stretcher circuits coincide in time.

10. The apparatus specified in claim 9 further including a threshold circuit operably connected between said AND gate and said inhibit circuit to permit only one of said first trigger pulses to be passed by said inhibit circuit during a half-cycle of said flip-flop output square wave.

References Cited

UNITED STATES PATENTS

| 2,561,182 | 7/1951 | Crane | 328—133 |
|---|---|---|---|
| 2,642,473 | 6/1953 | Kreer | 328—133 |
| 2,858,425 | 10/1958 | Gordon | 328—134 |
| 2,858,428 | 10/1958 | Torre | 328—134 |
| 3,253,223 | 5/1966 | Kettel | 328—133 |
| 3,245,079 | 4/1966 | Stover | 328—133 |

ARTHUR GAUSS, *Primary Examiner.*

H. A. DIXON, *Assistant Examiner.*

U.S. Cl. X.R.

307—295